US007710411B2

(12) United States Patent
Reber et al.

(10) Patent No.: US 7,710,411 B2
(45) Date of Patent: May 4, 2010

(54) METHOD AND SYSTEM FOR DISPLAYING TEXTUAL INFORMATION

(76) Inventors: William L. Reber, 2812 Deerfield La., Rolling Meadows, IL (US) 60008; Bruce E. Stuckman, 10700 Rangeview Dr., Austin, TX (US) 78730

( * ) Notice: Subject to any disclaimer, the term of this patent is extended or adjusted under 35 U.S.C. 154(b) by 544 days.

(21) Appl. No.: 11/670,868

(22) Filed: Feb. 2, 2007

(65) Prior Publication Data
US 2007/0126704 A1    Jun. 7, 2007

Related U.S. Application Data

(63) Continuation of application No. 10/769,826, filed on Feb. 2, 2004, now Pat. No. 7,173,621, which is a continuation of application No. 09/815,531, filed on Mar. 23, 2001, now Pat. No. 6,686,928, which is a continuation of application No. 08/606,615, filed on Feb. 26, 1996, now Pat. No. 6,292,176.

(51) Int. Cl.
*G06F 3/038*    (2006.01)
(52) U.S. Cl. .................. 345/204; 345/467; 434/224
(58) Field of Classification Search .............. 345/169, 345/204, 467–471, 684–687; 434/178, 179, 434/224, 317
See application file for complete search history.

(56) References Cited

U.S. PATENT DOCUMENTS

| | | |
|---|---|---|
| 3,938,139 A | 2/1976 | Day |
| 3,976,995 A | 8/1976 | Sebestyen |
| 4,054,948 A | 10/1977 | Grier et al. |
| 4,121,228 A | 10/1978 | Cowe et al. |
| 4,159,417 A | 6/1979 | Rubincam |
| 4,160,242 A | 7/1979 | Fowler et al. |
| 4,350,070 A | 9/1982 | Bahu |
| 4,397,635 A | 8/1983 | Samuels |
| 4,476,462 A | 10/1984 | Feldman |
| 4,579,533 A | 4/1986 | Anderson et al. |

(Continued)

OTHER PUBLICATIONS

Reasons for Allowance U.S. Appl. No. 10/769,826 Sep. 14, 2006.

(Continued)

*Primary Examiner*—Richard Hjerpe
*Assistant Examiner*—Kimnhung Nguyen
(74) *Attorney, Agent, or Firm*—Schwabe, Williamson & Wyatt, P.C.

(57) ABSTRACT

A system for displaying textual information includes a receiver (300) for receiving textual information that includes a plurality of words. A text segmenter (302), operatively associated with the receiver (300), segments the plurality of words into a plurality of word segments, each word segment having one or more words. A user interface device (304) receives a signal initiated by an action of a user to indicate a display rate. A display device (306) including a processor and a memory, is coupled to the text segmenter and the user interface device. The display device (306) displays the word segments in a temporal sequence by displaying a first word segment for a first display duration, that is based on the display rate, at a first position on the display device (306) and automatically proceeding to display a second word segment for a second display duration, that is based on the display rate, at a second position on the display device (306).

21 Claims, 4 Drawing Sheets

U.S. PATENT DOCUMENTS

| | | | |
|---|---|---|---|
| 4,609,919 | A | 9/1986 | Miyazaki et al. |
| 4,639,225 | A | 1/1987 | Washizuka |
| 4,660,032 | A | 4/1987 | Tsunoda |
| 4,674,066 | A | 6/1987 | Kucera |
| 4,774,596 | A | 9/1988 | Hashimoto |
| 4,779,080 | A | 10/1988 | Coughlin et al. |
| 4,820,167 | A | 4/1989 | Nobles et al. |
| 4,854,878 | A | 8/1989 | Malvino et al. |
| 4,855,725 | A | 8/1989 | Fernandez |
| 4,884,974 | A | 12/1989 | DeSmet |
| 4,899,292 | A | 2/1990 | Montagna et al. |
| 4,912,671 | A | 3/1990 | Ishida |
| 4,952,927 | A | 8/1990 | DeLuca et al. |
| 4,985,697 | A | 1/1991 | Boulton |
| 4,994,912 | A | 2/1991 | Lumelsky et al. |
| 4,997,374 | A | 3/1991 | Simone |
| 5,021,989 | A | 6/1991 | Fujisawa et al. |
| 5,107,259 | A | 4/1992 | Weitzen et al. |
| 5,125,078 | A | 6/1992 | Matsuda et al. |
| 5,146,552 | A | 9/1992 | Cassoria et al. |
| 5,147,205 | A | 9/1992 | Gross et al. |
| 5,157,783 | A | 10/1992 | Anderson et al. |
| 5,165,016 | A | 11/1992 | Takahashi |
| 5,167,508 | A | 12/1992 | McTaggart |
| 5,173,051 | A | 12/1992 | May et al. |
| 5,199,104 | A | 3/1993 | Hirayama |
| 5,208,745 | A | 5/1993 | Quentin et al. |
| 5,214,696 | A | 5/1993 | Keiser, II et al. |
| 5,228,859 | A | 7/1993 | Rowe |
| 5,233,333 | A | 8/1993 | Borsuk |
| 5,239,665 | A | 8/1993 | Tsuchiya |
| 5,241,671 | A | 8/1993 | Reed et al. |
| 5,243,582 | A | 9/1993 | Yamauchi et al. |
| 5,256,067 | A | 10/1993 | Gildea et al. |
| 5,275,569 | A | 1/1994 | Watkins |
| 5,293,314 | A * | 3/1994 | Sakai ..................... 715/201 |
| 5,301,172 | A | 4/1994 | Richards et al. |
| 5,302,132 | A | 4/1994 | Corder |
| 5,339,091 | A | 8/1994 | Yamazaki et al. |
| 5,350,303 | A | 9/1994 | Fox et al. |
| 5,351,190 | A | 9/1994 | Kondo |
| 5,355,352 | A | 10/1994 | Kobayashi et al. |
| 5,392,337 | A | 2/1995 | Baals et al. |
| 5,487,090 | A | 1/1996 | Ide |
| 5,519,824 | A | 5/1996 | Lizzi |
| 5,546,394 | A | 8/1996 | Eaton et al. |
| 5,696,982 | A | 12/1997 | Tanigawa et al. |
| 5,710,576 | A | 1/1998 | Nishiyama et al. |
| 5,710,639 | A * | 1/1998 | Kuznicki et al. ....... 358/426.03 |
| 5,774,109 | A | 6/1998 | Winksy et al. |
| 6,111,576 | A * | 8/2000 | Moreland et al. ........... 715/841 |
| 6,292,176 | B1 | 9/2001 | Reber et al. |
| 6,686,928 | B1 | 2/2004 | Reber et al. |
| 6,693,636 | B2 | 2/2004 | Bluthgen et al. |
| 7,173,621 | B2 | 2/2007 | Reber et al. |

OTHER PUBLICATIONS

Office Action for U.S. Appl. No. 10/769,826 mailed Mar. 17, 2006.
Office Action for U.S. Appl. No. 10/769,826 mailed Dec. 1, 2004.
Office Action for U.S. Appl. No. 08/606,615 mailed Mar. 1, 2000.
Office Action for U.S. Appl. No. 08/606,615 mailed Mar. 3, 1999.
Office Action for U.S. Appl. No. 08/606,615 mailed Mar. 12, 1998.
Office Action for U.S. Appl. No. 08/606,615 mailed Jun. 8, 1998.
Office Action for U.S. Appl. No. 08/606,615 mailed Sep. 15, 1999.
Office Action for U.S. Appl. No. 09/815,531 mailed May 20, 2003.
Office Action for U.S. Appl. No. 09/815,531 mailed Aug. 13, 2002.
Office Action for U.S. Appl. No. 09/815,531 mailed Dec. 16, 2002.
Young, Sheryl R., "RSVP: A task, Reading Aid, and Research Tool," Behavior Research Methods, Instruments, & Computers, 1984, 16(2), pp. 121-124a.
"Using WordPerfect® 5.1, Special Edition," Que Corporation, 1989, pp. cover, ii, 43-48, 61-63, and 121-127.
Kang, T. Jin and Muter, Paul, "Reading Dynamically Displayed Text," Behaviour & Information Technology, 1989, vol. 8, No. 1, pp. 33-42.
Martin, Ethel and Boff, Kenneth R., "14.1: Human-Machine Interaction With Serial Visual Displays," SID 90 Digest (1990), pp. 257-260.
Rubin, Gary S. and Turano, Kathleen, "Reading Without Saccadic Eye Movements," Vision Res., 1992, vol. 32, No. 5, pp. 895-902.
"Mastering WordPerfect® 5.1 & 5.2 For Windows™," Sybex, Inc., 1993, pp. cover, copyright page, 103, and 142-143.
Rubin, Gary S. and Turano, Kathleen, "Low Vision Reading With Sequential Word Presentation," Vision Res., 1994, vol. 34, No. 13, pp. 1723-1733.
Wright, Jr., Fred, "A retiree who has spent a lifetime tinkering with electronics has dreamed up a device to read computerized books," Story in Tampa Tribune, Saturday, Aug. 26, 1995, 2 pages.
Machrone, Bill, "Can Your PC Help You Read Faster," PC Magazine, Mar. 12, 1996, p. 83.

* cited by examiner

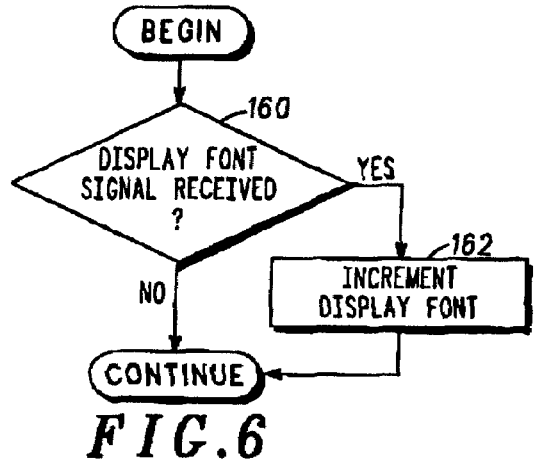
FIG.6
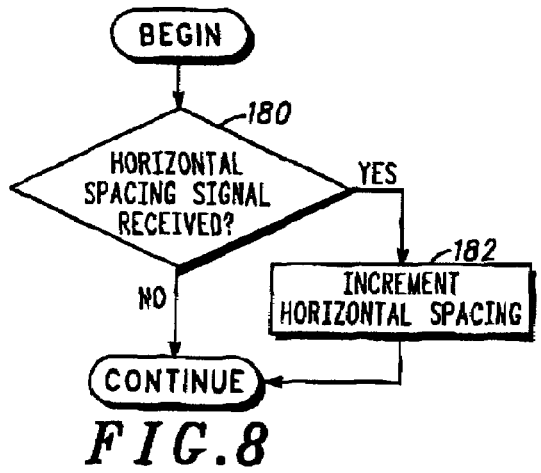
FIG.8
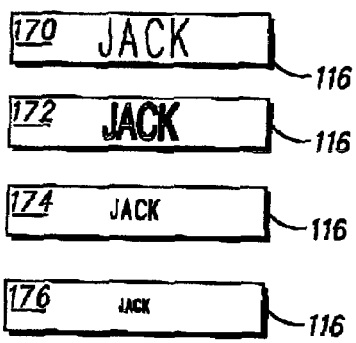
FIG.7
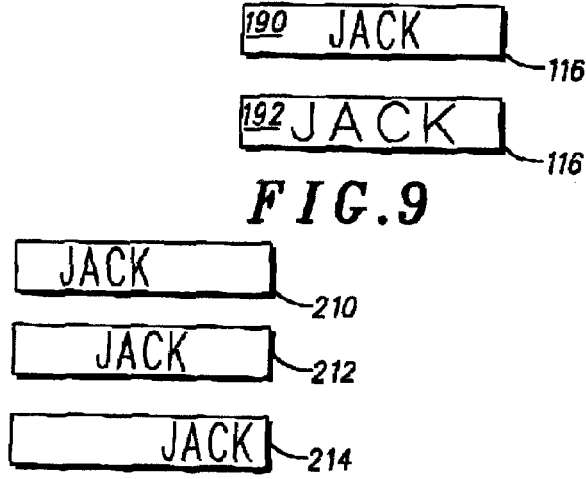
FIG.9
FIG.11
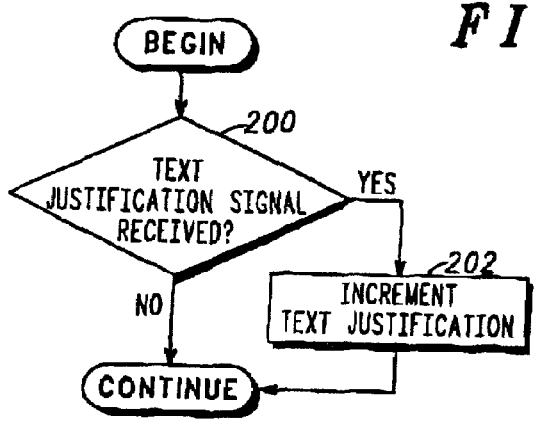
FIG.10
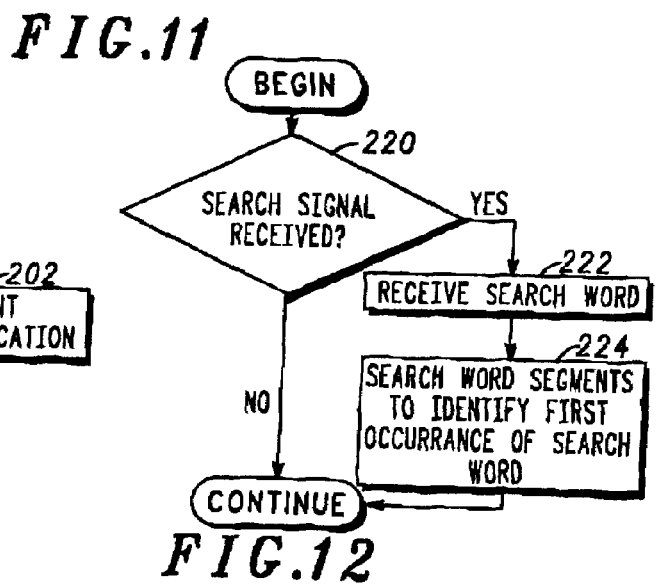
FIG.12

METHOD AND SYSTEM FOR DISPLAYING TEXTUAL INFORMATION

RELATED APPLICATIONS

The present application is related to the following applications which are assigned to a previous assignee of the present invention:

"System and Method for Limiting Access to a Book Card", having Ser. No. 08/572,346, filed on Dec. 16, 1995.

"Apparatus and Method for Storing and Presenting Text", having Ser. No. 08/572,451, filed on Dec. 16, 1995.

"Method and Electronic Book for Creating a Plurality of Versions of a Book", having Ser. No. 08/572,485, filed on Dec. 16, 1995.

"An Electronic Book Diary and Method", having Ser. No. 08/572,602, filed on Dec. 16, 1995.

"Method and Apparatus for Inhibiting the Operation of an Electronic Device During Take-Off and Landing of an Aircraft", having Ser. No. 08/572,603, filed on Dec. 16, 1995.

"Method and System for Inhibiting the Operation of an Electronic Device During Take-Off and Landing of an Aircraft", having Ser. No. 08/572,484, filed on Dec. 16, 1995.

"Method and Apparatus for Abridging Text", having Ser. No. 08/572,834, filed on Dec. 16, 1995.

"A Method of Substituting Names in an Electronic Book", having Ser. No. 08/572,780, filed on Dec. 16, 1995.

"System and Method of Authoring Tools for an Electronic Book", having Ser. No. 08/572,358, filed on Dec. 16, 1995.

"System and Method for an Automatic Library for a Plurality of Book Cards", having Ser. No. 08/572,482, filed on Dec. 16, 1995.

"Electronic Book and Method of Selecting a Primary Font and a Primary Size for Displaying Text Therewith", having Ser. No. 08/572,407, filed on Dec. 16, 1995.

"Electronic Book and Graphical User Interface for Selecting a Book to Read Therewith", having Ser. No. 08/572,406, filed on Dec. 16, 1995.

"Electronic Book and Graphical User Interface to Provide Control Thereof", having Ser. No. 08/572,403, filed on Dec. 16, 1995.

"Electronic Book and Method of Storing at Least One Book in an Internal Machine-Readable Storage Medium", having Ser. No. 08/572,593, filed on Dec. 16, 1995.

"Electronic Book and Method of Annotation Therefor", having Ser. No. 08/572,367, filed on Dec. 16, 1995.

"Electronic Book and a Method of Displaying a Relative Position of a Current Page of a Book Therefor", having Ser. No. 08/572,373, filed on Dec. 16, 1995.

"Method and System for Encoding a Book for Reading Using an Electronic Book", having Ser. No. 08/572,468, filed on Dec. 16, 1995.

"Electronic Book and Method of Displaying an Animated Page Turn Therefor", having Ser. No. 08/572,405, filed on Dec. 16, 1995.

"Electronic Book and Method of Controlling a Rate of Information Displayed Thereby", having Ser. No. 08/572,372, filed on Dec. 16, 1995.

"Reusable Housing and Memory Card Therefor", having Ser. No. 08/572,413, filed on Dec. 16, 1995, now U.S. Pat. No. 5,661,635.

"Electronic Book and Method of Displaying at Least One Reading Metric Therefor", having Ser. No. 08/572,842, filed on Dec. 16, 1995, now U.S. Pat. No. 5,697,793.

"Electronic Book and Method of Creating a Personal Log of Reading Activity Therefor", having Ser. No. 08/572,456, filed on Dec. 16, 1995.

"Electronic Book Having Highlighting Feature", having Ser. No. 08/572,469, filed on Dec. 16, 1995, now U.S. Pat. No. 5,663,748.

"Electronic Book and Method of Capturing and Storing a Quote Therein", having Ser. No. 08/572,601, filed on Dec. 16, 1995.

The subject matter of the above-identified related inventions are hereby incorporated by reference into the disclosure of this invention.

This application is a continuation of application Ser. No. 10/769,826 entitled METHOD AND SYSTEM FOR DISPLAYING TEXTUAL INFORMATION, filed Feb. 2, 2004 and will issue on Feb. 6, 2007 (U.S. Pat. No. 7,173,621), which is a continuation of patent application Ser. No. 09/815,531 (now U.S. Pat. No. 6,686,928) entitled METHOD AND SYSTEM FOR DISPLAYING TEXTUAL INFORMATION, filed Mar. 23, 2001, which is a continuation of patent application Ser. No. 08/606,615 (now U.S. Pat. No. 6,292,176) entitled METHOD AND SYSTEM FOR DISPLAYING TEXTUAL INFORMATION, filed Feb. 26, 1996.

TECHNICAL FIELD

The present invention relates generally to methods and systems for displaying textual information and, in particular, to their use in conjunction with hand-held electronic reading devices.

BACKGROUND OF THE INVENTION

Various types of hand-held electronic reading devices have been proposed to electronically display textual information for reading by a user. A typical hand-held electronic reading device includes a display device to display the textual information and a user interface which allows a user to navigate through the textual information and access various features of the electronic reading device. The display device and the user interface are incorporated in a hand-held housing to facilitate portability of the electronic reading device.

Some prior art devices include displays that require the user to scan across a line and sequentially read the words. This kind of display mimics that of the printed page of words, a direct consequence of the paradigm created by the Gutenberg's printing press. The intent of many of the existing devices is to emulate the scanning experience associated with reading words upon a printed page. Although some devices enable the user to increment the lines, one line at a time or several lines at a time or to continuously scroll the lines of words, the reader still has the same scanning experience associated with reading words upon a printed page. In this case the reader scans the first line typically from left to right with his eyes and then re-positions his eyes to scan the second line. The use of these devices and their requirement for constant scanning tends to tire the eye muscles.

Other prior art devices scroll the text of a message from left to right to eliminate the scanning motion of the eyes. This form of scrolling, can adversely affect the ability of the user to comprehend the message's meaning.

Thus there is a need for an improved method and device which can communicate messages whose length is not limited by the physical dimensions of the display screen and whose comprehension is not seriously affected by the scrolling techniques employed in existing devices.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 6 presents a flowchart representation of a method used in accordance with one embodiment of the present invention.

FIG. 7 presents a pictorial diagram of an example sequence of display fonts.

FIG. 8 presents a flowchart representation of a method used in accordance with one embodiment of the present invention.

FIG. 9 presents a pictorial diagram of an example sequence of horizontal spacings.

FIG. 10 presents a flowchart representation of a method used in accordance with one embodiment of the present invention.

FIG. 11 presents a pictorial diagram of an example sequence of text justifications.

FIG. 12 presents a flowchart representation of a method used in one embodiment of the present invention.

DETAILED DESCRIPTION OF PREFERRED EMBODIMENTS

The various embodiments of the present invention display messages of various length upon a display screen that is, generally, as small as a single message line display or smaller. The physical characteristics of the single message display are quite suitable for hand-held use. This avoids the use of larger displays have a resulting increase in size, weight and power consumption which seriously affect their portability and performance.

The present invention also provides a display which comprises a spatial position within a display screen in which one or more words from a message are displayed in a temporal sequence whose display rate may be controlled by the user from as slow as one word per minute to several thousand words per minute. The resulting display is free of any scrolling effects and allows the user to minimize eye movements associated with scanning of a message.

The present invention produces a staring display. The user's eyes are accommodated as the device display is held at a fixed distance. There is no scanning movement of the eyes either horizontally or vertically, rather the user continues to stare at the display of the message as incremental segments of the message are presented in the same spatial position within the display screen where they persist for a period of time and then disappear being replaced by a new segment of the message that, in turn, persists for a specific period of time and then also disappears as a new segment of the text appears within the same spatial location of the display screen. The staring display favors a smaller, minimal dimensioned display while improving human comprehension of displayed messages. Thus the claimed invention addresses the problem of improving human comprehension of visually communicated messages while minimizing display size, power, weight and performance.

The present invention further comprises a set of controls for modifying the temporal sequence of the message being displayed, the length of the message segment displayed, the size and font of the word segments displayed, and the horizontal spacing of the letters of the message segment displayed. The set of controls also comprise a means for message navigation of a single message which includes the functions of start, stop, repeat, pause, return, and search.

Figure 1:
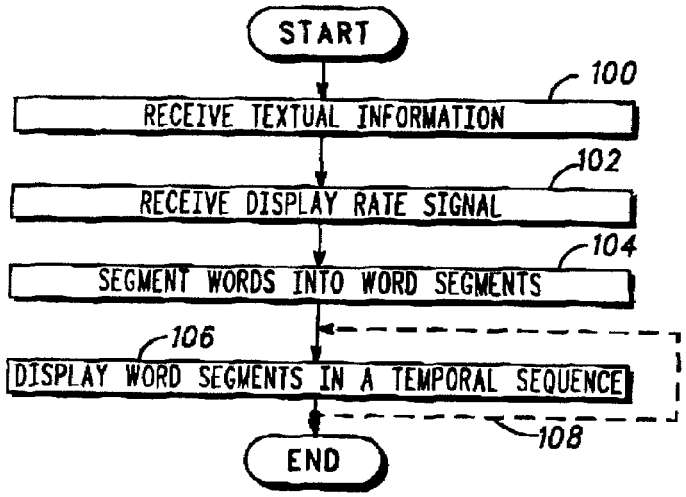
FIG. 1 presents a flowchart representation of a method in accordance with one embodiment of the present invention.

FIG. 1 presents a flowchart representation of a method in accordance with one embodiment of the present invention. In particular, a method for displaying textual information is presented. In step 100 textual information that includes a plurality of words is received. In step 102 a signal is received that indicates a display rate. In step 104 the plurality of words are segmented into a plurality of word segments, each word segment having one or more words. In step 106 the word segments are displayed in a temporal sequence by displaying a first word segment for a first display duration at a first position on a display device and automatically proceeding to display a second word segment for a second display duration, at a second position on a display device. The first and second display durations are based on the display rate. Optional feedback path 108 indicates the repetition of step 106 for successive word segments to display more than two (and potentially all) of the plurality of word segments.

In one embodiment of the present invention, the repetition of step 106 is ceased after a predetermined period of time without the action of the user. In particular, a "read" button is pressed by the user to initiate the step of displaying. The displaying of word segments in a temporal sequence continues as long as the button is pressed. If the button is released, the sequence is interrupted. This helps in situations where the reader may become distracted during reading. If the display were allowed to continue it may be possible that once the reader returned to reading, he or she could have a difficult time determining where, in the textual information, he or she left-off.

In an alternative embodiment, a "start" button can be pressed to begin the display of a temporal sequence of word segments. This embodiment allows a user to read without touching the device. The reading can then be paused by pressing a "pause" button and restarted by pressing either the start button or the pause button a second time. The display sequence can be terminated by pressing a "stop" button.

Consider the following example of the operation of one embodiment of the present invention. In this example the reader (a user) wishes to read the classic nursery rhyme:

Jack and Jill went up the hill to fetch a pail of water. Jack fell down and broke his crown and Jill came tumbling after.

A hand-held electronic reading device, that includes an LCD display, receives a plurality of data that represent the nursery rhyme above. This data is segmented into a plurality of word segments as follows.

| Segment No. | Segment |
| --- | --- |
| 1 | /Jack and Jill/ |
| 2 | /went up the hill/ |
| 3 | /to fetch/ |
| 4 | /a pail of water./ |
| 5 | /Jack fell down/ |
| 6 | /and broke his crown/ |
| 7 | /and Jill/ |
| 8 | /came tumbling after./ |

The segmentation of the textual information is dependent upon the selection of a maximum word segment size. In the example given above the maximum word segment size is four, however, other values are possible. The variables to be considered in choosing this value include the display device used, the font, display rate, and the reading preferences of the users appear to be capable of assimilating textual information, presented using the various methods and systems of the present invention, with a maximum word segment size of up to seven words without appreciable scanning of the eyes. Other users feel more comfortable with a maximum word segment size of only one or two words.

The method proceeds by receiving a signal indicative of a display rate. This display rate can be a display rate chosen by the user via the device's user interface, the last display rate used by the user or a default display rate. The word segments of "Jack and Jill" are displayed in a temporal sequence by displaying the first word segment /Jack and Jill/ for a first display duration at a first position on a display device and thereafter automatically proceeding to display the second word segment /went up the hill/ for a second display duration and so on for the remaining word segments.

Figure 2:
FIG. 2 presents a pictorial diagram of an example sequence of displayed word segments.

FIG. 2 presents a pictorial diagram of an example sequence of displayed word segments. In particular, the example sequence corresponds to the example presented in the preceding paragraphs. In this embodiment of the present invention the step of displaying the word segments includes displaying the second word segment such that the beginning of the second display duration occurs after the end of the first display duration. Image 110 represents the first word segment /Jack and Jill/ displayed on a display device 116. Image 112 represents the second word segment /went up the hill/ displayed on display device 116 at some time after. Image 114 represents the display of the third word segment /to fetch/ that is displayed after the second word segment. In a preferred embodiment, the step of displaying the first and second word segments are displayed each as a single line of text.

Figure 3:
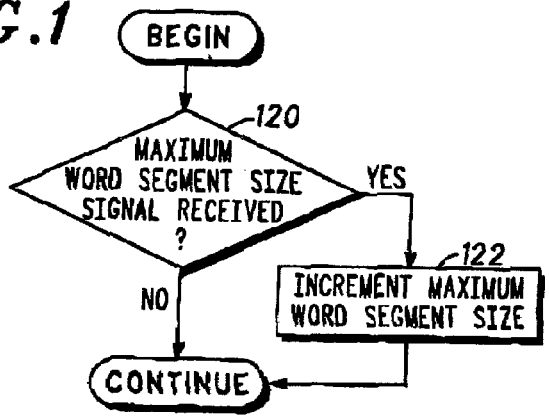
FIG. 3 presents a flowchart representation of a method used in accordance with one embodiment of the present invention.

FIG. 3 presents a flowchart representation of a method used in accordance with one embodiment of the present invention. In this embodiment, the user is given the opportunity to select the maximum word segment size. In decision block 120, it is determined if a signal has been received, initiated by an action of the user such as by the pressing of a button attached to a switch, indicating a change to the maximum word segment size. If the signal is not received, the overall method continues with a value for the maximum word segment size determined either from a default value or from the previous maximum word segment size, if any. If a maximum word segment size signal has been received, the maximum word segment size is incremented as shown in step 122.

In this fashion, the user can repeatedly increment the maximum word segment size until the desired value is reached. If the desired value is less than the current value, the user can continue to increment the maximum word segment size until a largest value is reached, at which point, a further signal initiated by the user causes the procedure to "wrap-around" to a smallest maximum word segment size. In a further embodiment of the present invention, the maximum word segment size is entered directly by the user by means of a numerical keypad, thereby avoiding the repetitive incrementing of the maximum word segment size.

This maximum word segment size selection procedure can be executed prior to step 106 of displaying the word segments and step 104 of segmenting the words into word segments. In a preferred embodiment, this procedure can also be executed by interrupting the temporal sequence display in step 106 and, in its place, displaying the value of the maximum word segment size. Control can then be returned to the step of displaying upon the generation of a signal, initiated by an action of the user or by a time-out condition, indicating the temporal display can continue.

Figure 4:
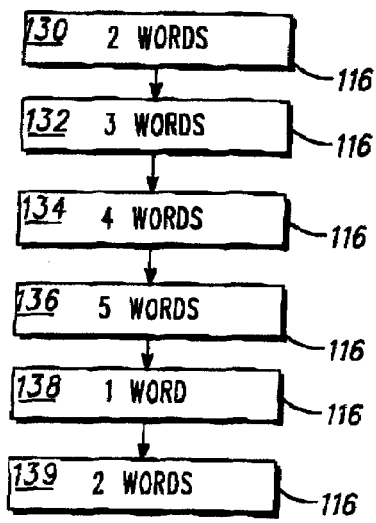
FIG. 4 presents a pictorial diagram of an example sequence of displayed maximum word segment sizes.

FIG. 4 presents a pictorial diagram of an example sequence of displayed maximum word segment sizes. In this example, the largest maximum word segment size is 5 and the smallest maximum word segment size is 1. Further, the default maximum word segment size is 2. Image 130 represents a display of the default maximum word segment size on display device 116. Image 132 represents the display after a signal is received indicating the user's intent to increment the value of the maximum word segment size. Images 134, 136, 137, 138 and 139 represent successive displayed images after additional signals are received.

Figure 5:
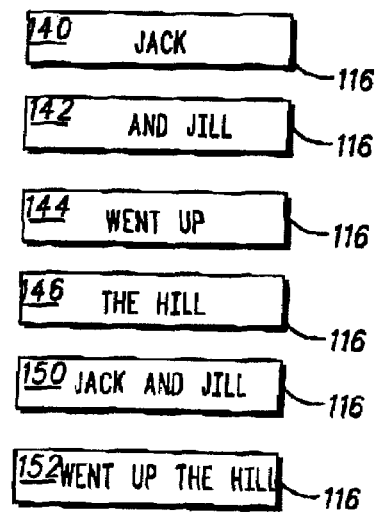
FIG. 5 presents a pictorial diagram of two example sequences of displayed word segments.

FIG. 5 presents a pictorial diagram of two example sequences of displayed word segments. In particular, these example sequences each correspond to the Jack and Jill example previously presented. The first display sequence comprising images 140, 142, 144 and 148 illustrate the display of the first seven words of the textual information with a maximum word segment size of two. The second display sequence comprising images 150 and 152 illustrate the display of the same information with a maximum word segment size of 4.

It should be noted form this example that the choice of maximum word segment size and the corresponding segmentation in the first display sequence coincides with a natural rhythm of the piece when it is read aloud as a rhyme. Alternatively, the maximum word segment size and the corresponding segmentation in the second display sequence coincide more closely with the structure and content of the first sentence of the piece—"Jack and Jill" are the subjects and "went up the hill" are the actions they performed.

While the maximum word segment size has an influence on how well the display of the piece matches the way the piece would naturally be read, the segmentation itself has a more direct bearing on this. In a preferred embodiment of the present invention, the step of segmenting words into word segments includes segmenting the plurality of words into a plurality of word segments based on the content of the words. In the simplest form, the punctuation of the piece can be used in segmentation. In this embodiment, a word segment would end with a comma, colon, semicolon or period instead of going on to the next word or words. In further embodiments, the segmentation of the words can more directly correspond to the form and structure of each sentence. The segmentation of the textual information into word segments would begin with a parsing of the textual information into sentences and into sub-sentence components. To the extent these subsentence components do not violate the maximum word segment size, these subsentence components are assigned to be the word segments. Any over-size word segments are then split-up into word segments conforming to the maximum word segment size.

In an additional embodiment of the present invention, information that includes embedded graphical information as well as text is segmented. In a preferred embodiment, the presence of graphical information is indicated on the display using a graphics specific icon. In this fashion the user knows that graphical information is present in the original material that corresponds with the displayed text of the word segment. If the display of word segments is paused, the graphics icon can be selected—thereby displaying a reference or pointer to the original graphical information. In one embodiment of the present invention this reference or pointer includes an electronic address of the original source of the graphical information. In another embodiment, the reference or pointer includes an citation of the original source material that includes the page that the graphical information is found.

FIG. 6 presents a flowchart representation of a method used in accordance with one embodiment of the present invention. In this embodiment, the step of displaying includes displaying the first and second word segments in a selectable display font. A signal, initiated by the action of a user, is received to indicate the display font. In decision block 160 it is determined if the display font signal is received. If the signal is not received, the overall method continues with either from a default font or from the previous font, if any. If a display font signal has been received, the display font is incremented as shown in step 162.

In this fashion, the user can repeatedly increment the display font until the desired value is reached. If the user has passed the font he or she desires, the user can continue to increment the display font until a last font is reached, at which point, a further signal initiated by the user causes the procedure to "wrap-around" to a first font. In a preferred embodiment of the present invention the selection of display fonts includes fonts of different sizes to accommodate the tastes of different users in varying reading conditions.

This display font selection procedure can be executed prior to step 106 of displaying the word segments. In a preferred embodiment, this procedure can also be executed by interrupting the temporal sequence display in step 106 and, in its place, displaying the current word segment in the selected font. Control can then be returned to the step of displaying upon the generation of a signal, initiated by an action of the user or by a time-out condition, indicating the temporal display can continue.

FIG. 7 presents a pictorial diagram of an example sequence of display fonts. Image 170 represents a display of the current word segment in a first font on display device 116. Image 172 represents the display after a signal is received indicating the user's intent to increment the display font. Images 174 and 176 represent successive displayed images after additional signals are received.

FIG. 8 presents a flowchart representation of a method used in accordance with one embodiment of the present invention. In this embodiment, the step of displaying includes displaying the first and second word segments in a selectable horizontal spacing. A signal, initiated by the action of a user, is received to indicate the horizontal spacing. In decision block 180 it is determined if the horizontal spacing signal is received. If the signal is not received, the overall method continues with either from a default spacing or from the previous spacing, if any. If a horizontal spacing signal has been received, the horizontal spacing is incremented as shown in step 182.

In this fashion, the user can repeatedly increment the horizontal spacing until the desired value is reached. If the user has passed the spacing he or she desires, the user can continue to increment the horizontal spacing until a last spacing is reached, at which point, a further signal initiated by the user causes the procedure to "wrap-around" to a first spacing.

This horizontal spacing selection procedure can be executed prior to step 106 of displaying the word segments. In a preferred embodiment, this procedure can also be executed by interrupting the temporal sequence display in step 106 and, in its place, displaying the current word segment in the selected horizontal spacing. Control can then be returned to the step of displaying upon the generation of a signal, initiated by an action of the user or by a time-out condition, indicating the temporal display can continue.

FIG. 9 presents a pictorial diagram of an example sequence of horizontal spacings. Image 190 represents a display of the current word segment in a first spacing on display device 116. Image 192 represents the display after a signal is received indicating the user's intent to increment the horizontal spacing.

FIG. 10 presents a flowchart representation of a method used in accordance with one embodiment of the present invention. In this embodiment, the step of displaying includes displaying the first and second word segments in a selectable text justification. A signal, initiated by the action of a user, is received to indicate the text justification. In decision block 200 it is determined if the text justification signal is received. If the signal is not received, the overall method continues with either from a default justification or from the previous justification, if any. If a text justification signal has been received, the text justification is incremented as shown in step 202.

In this fashion, the user can repeatedly increment the text justification until the desired value is reached. If the user has passed the justification he or she desires, the user can continue to increment the text justification until a last justification is reached, at which point, a further signal initiated by the user causes the procedure to "wrap-around" to a first justification.

This text selection procedure can be executed prior to step 106 of displaying the word segments. In a preferred embodiment, this procedure can also be executed by interrupting the temporal sequence display in step 106 and, in its place, displaying the current word segment in the selected text justification. Control can then be returned to the step of displaying upon the generation of a signal, initiated by an action of the User or by a time-out condition, indicating the temporal display can continue.

FIG. 11 presents a pictorial diagram of an example sequence of text justifications. Image 210 represents a display of the current word segment in left-justification on display device 116. Image 212 represents the display after a signal is received indicating the user's intent to increment the text justification to center-justification. Image 214 represents the display after a signal is received indicating the user's intent to increment the text justification to right-justification.

FIG. 12 presents a flowchart representation of a method used in one embodiment of the present invention. In this embodiment, a user can search for a particular word segment by entering a search word. A signal, initiated by the action of a user, indicates a user's intent to have a search performed. In decision block 220 it is determined if a search signal has been received. If not, the overall method continues, If a search signal is received, the procedure receives a search term from the user as is shown in step 222. In a preferred embodiment, the search word is entered by means of a keypad entry. Once the search word is entered, the word segments are searched to identify the first occurrence of the search word. This word segment becomes the current word segment.

This search procedure can be executed prior to step 106 of displaying the word segments. In this case the first word segment to be displayed is the current word segment—the word segment with the first occurrence of the search word. The display of the word segments in the temporal sequence then continues with the display of the next word segment, regardless of whether or not it contains the search term, and so on.

In a preferred embodiment, this procedure can also be executed by interrupting the temporal sequence display in step 106 and, in its place, displaying the search word as it is entered. Control can then be returned to the step of displaying upon the generation of a signal, initiated by an action of the user indicating that the search be abandoned, by a time-out condition or by the completion of the search, indicating the temporal display can continue. The temporal display continues from the identified word segment that contains the first occurrence of the search word, if any.

In one embodiment of the present invention, a user is allowed to mark a word segment of interest by initiating a mark signal by pressing a "mark" button. In a preferred embodiment, the display device displays an indication of such a mark, such as, with a mark icon in a corner of the display. The user is also allowed to return to view these marked word segments in the order they were marked by repeatedly initiating a return signal by repeatedly pressing a "return" button.

Figure 13:
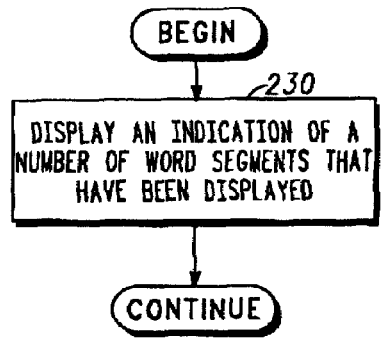
FIG. 13 presents a flowchart representation of a method used in accordance with one embodiment of the present invention.

FIG. 13 presents a flowchart representation of a method used in accordance with one embodiment of the present invention. This embodiment includes step 230 of displaying an indicator of a number of the plurality of word segments that have been displayed. This allows the reader the opportunity to determine how much he or she has read up to the current point in time. A counter counts the number of words or the number of word segments that have been read. In a preferred embodiment, this indicator is presented on the display device as a message indicating the number of words read in the context of a total number of word segments in the plurality of word segments. In an alternative embodiment this indication is displayed on a second display device as a bar graph of the number of word segments that have been displayed in the context of a total number of word segments in the plurality of word segments. This type of display also allows the user to determine how much is left to be read in a particular piece.

Figure 14:
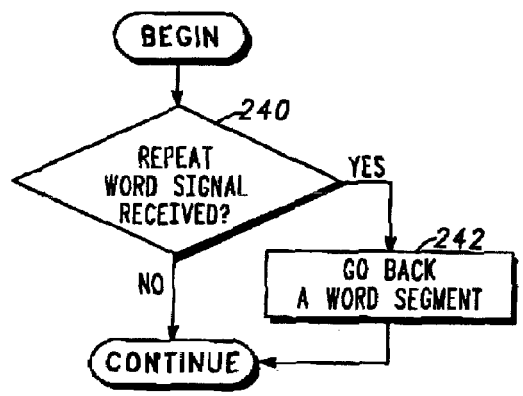
FIG. 14 presents a flowchart representation of a method used in one embodiment of the present invention.

FIG. 14 presents a flowchart representation of a method used in one embodiment of the present invention. In this embodiment, a user can repeat a particular word segment. A signal, initiated by the action of a user, indicates a user's intent to repeat. In decision block 240 it is determined if a repeat signal has been received. If not, the overall method continues, If a repeat signal is received, the procedure goes back n word segments as shown in step 242 and continues the temporal display sequence from that point. The value of n can be one or greater—corresponding a user-selected value or based on a default value. In other words, the repeat procedure begins by receiving a signal initiated by the action of a user to indicate a repeat word segment condition. The first word segment as defined by step 106 is assigned to be the repeat word segment—the repeat word segment being n word segments previous to the current word segment. Finally, step (d) is repeated for the first word segment and subsequent word segments from the plurality of word segments.

Figure 15:
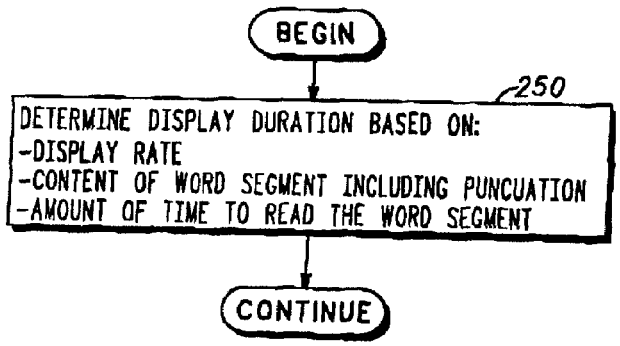
FIG. 15 presents a flowchart of a method used in accordance with one embodiment of the present invention.

FIG. 15 presents a flowchart of a method used in accordance with one embodiment of the present invention. In this embodiment the display duration of a word segment is determined based on a plurality of factors. In particular, the display duration of a word segment is determined based on such factors as the display rate, the content of the word segment (potentially including punctuation), and the expected amount of time necessary to read the word segment as shown in step 250. In this fashion the display duration for word segments in a temporal sequence can be nonuniform—with some word segments being displayed for longer durations than other word segments.

The desired display rate indicated by the user can serve as the basis for determining the display duration. However, this value can be adjusted up or down based on the content of an individual word segment. Word segments with relatively more words than others, can be assigned longer display durations than shorter word segments in proportion to the expected assimilation time of the reader. Words can be sorted by their relative frequency in common text. A look-up table with a dictionary of words and their relative frequency can be used to determine the display duration of a word segment. For instance, the word segment "I know" would be assigned a relatively shorter display time than the word segment "based on contexturality" given the relative infrequency of the word "contexturality". Likewise the presence of punctuation in a word segment such as a comma, colon, semi-colon, exclamation point or period can be used to increase the display duration based upon the pause one would imply if reading these segments.

In a further embodiment, the display duration for each word segment can be experimentally determined and assigned to each word segment based on the expected amount of time a representative user (or average of a number of users) take to read the word segment in context of the textual information. This embodiment lends itself more easily to an embodiment where the segmenting of the textual information is performed once off-line prior to the step of displaying as will be described in conjunction with the following figure.

Figure 16:
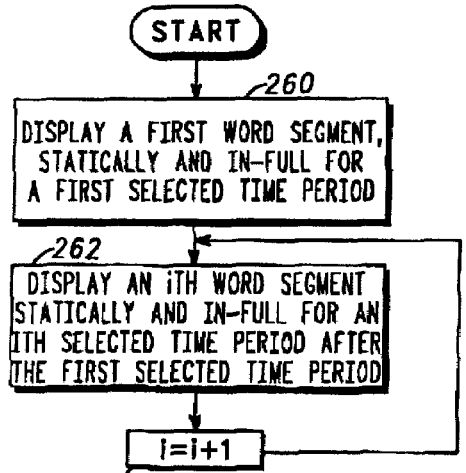
FIG. 16 presents a flowchart representation of an alternative embodiment of the present invention.

FIG. 16 presents a flowchart representation of an alternative embodiment of the present invention. This embodiment is for use in an electronic reading unit having a visual display device. In particular this embodiment includes a method for displaying textual information, the textual information including a sequence of non-overlapping word segments, each of the non-overlapping word segments having no more than seven words. The method begins in step 260 by displaying, on the visual display device, a first word segment from the sequence of non-overlapping word segments for a first selected time period, the first word segment being displayed statically and in-full for the first selected time period—wherein the first and ith selected time periods are determined based on a reading rate selected by a user and, respectively, based on the content of the first and ith word segments. The method continues in step 262 by displaying, on the visual display device, an ith word segment from the sequence of non-overlapping word segments for an ith selected time period, the ith word segment being displayed statically and in-full for the ith selected time period, the ith selected time period being after the first predetermined time period. In addition, the method continues by incrementing the value of i and repeating the step of displaying the ith word segment for incremented values of i. This embodiment of the present invention likewise yields a sequence of word segments that are displayed in a fashion that is, in many ways, similar to the method described in context with FIG. 1. It should be noted that the various alternative embodiments attributed to the method of FIG. 1 would likewise apply to the method of FIG. 16.

In a preferred embodiment the textual information, having previously been segmented into a plurality of word segments, is loaded in a memory device such as a standard PCMCIA memory card. The memory card is interfaced to the electronic reading unit by slipping the memory card in a PCMCIA card-slot in the-electronic reading unit. The electronic reading unit then serves as a platform for the various methods described herein. This configuration allows for more sophisticated segmentation of the textual information. Segmentation time and complexity can be increased due to the off-line nature of the segmentation. Further, the requirements of the electronic reading unit hardware are lessened by not having to perform this function.

Figure 17:
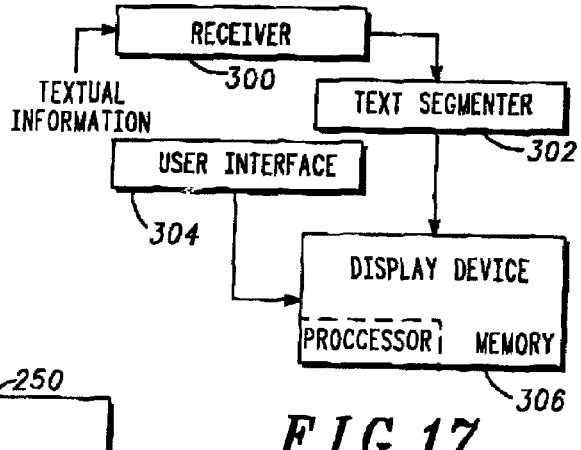
FIG. 17 presents a block diagram representation of a system used in accordance with the various embodiments of the present invention.

FIG. 17 presents a block diagram representation of a system used in accordance with the various embodiments of the present invention. In particular, a system for displaying textual information includes a receiver 300 for receiving textual information that includes a plurality of words. A text segmenter 302, operatively associated with the receiver 300, segments the plurality of words into a plurality of word segments, each word segment having one or more words. A user interface device 304 receives a signal initiated by the action of a user to indicate a display rate. A display device 306, including a processor such as a general microprocessor or the like and an electronic memory such as DRAM or SRAM, is coupled to the text segmenter and the user interface device. The display device 306 displays the word segments in a temporal sequence by displaying a first word segment for a first display duration, that is based on the display rate, at a first position on the display device 306 and automatically proceeding to display a second word segment for a second display duration, that is based on the display rate, at a second position on the display device 306.

Figure 18:
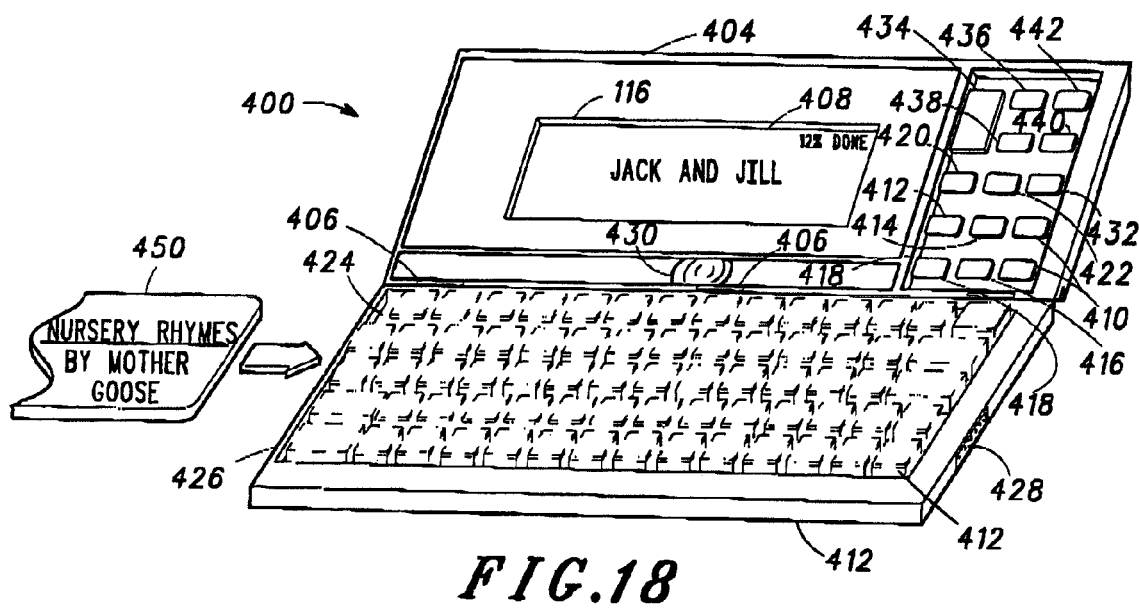
FIG. 18 presents a perspective view of a electronic reading unit in accordance with the present invention.

FIG. 18 presents a perspective view of a electronic reading unit in accordance with the present invention. In a preferred embodiment, this electronic reading unit 400 includes a body having base 402 and lid 404, attached thereto by means of integral hinges 406. Lid 404 and base 402 pivot between an open position (shown) and a closed position. Lid 404 contains a first LCD display device 116 for displaying a sequence of word segments. Display device 116 further displays an indicator 408 of a number word segments that have been displayed. Each of the buttons 410-422 and 432-442 are connected to switches (not shown) that are used to control the various functions of the device by means of the initiation of one or more signals.

The rate buttons 410 are used to control the display rate. The read button 412 can be pressed by the user to initiate display of word sequences and its release suspends the display of word sequences. The font button 412 is used to increment the display font. The size button 414 is used to control the maximum word segment size. The space button 416 is used to control the horizontal spacing of the display and justification button 418 is used to control the text justification. The search button 420 is used to initiate a search for a search word. The repeat button 422 is used to repeat one or more word segments. The pause button 432 allows a user to temporarily suspend the display of word sequences. The start button 434 and stop button 436 allow the user to start and stop the display sequence in an alternative embodiment. The mark button 440 allows a user to mark one or more word segments of interest and the return button 438 allows the user to return to these word segments.

Keyboard 424 allows the user to enter alphanumeric information in order to perform the various functions described in accordance with the methods of the present invention. In a preferred embodiment, the keyboard 424 is configured in the QWERTY style of a standard computer keyboard. However, other configurations are possible as is understood by those skilled in the art. Electronic reading unit 400 also includes a PCMCIA card slot 426 for accepting PCMCIA memory cards containing textual information such as card 450. Connector 428 likewise provides an interface for downloading textual information from computers, on-line services and the like. Speaker 430 is coupled to an integrated amplifier and voice synthesis unit that enunciates the word segments as they are displayed. The sound button 442 toggles the voice synthesis unit on and off.

While the various embodiments of the present invention have been presented in the context of a system for displaying textual information and an electronic reading unit, the application of the present invention as a subsystem to an existing system is also possible. The use of the present invention as a method and system for displaying textual messages in a wired or wireless communication system including a subscriber unit such as a pager, telephone, cellular telephone or answering machine are possible. In one embodiment, the present invention is an embedded application in these existing devices sharing the functionality of one or more of the existing devices elements and or components. In an alternative embodiment, the present invention is embedded in a PCMCIA card or smartcard that is inserted in an existing device in order to perform the various functions described herein.

In an additional embodiment of the present invention the present invention is embodied in a standard PCMCIA card or stand-alone smart card having its own display, user interface and energy source. This configuration provides the ultimate in small size and portability.

In a further embodiment of the present invention, the various methods described herein are implemented as one or more software procedures running on a programmed computer or computer processor. These procedures, in conjunction with the computer system, can provide the functionality described herein to the user.

While specific embodiments of the present invention have been shown and described, it will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

We claim:

1. A method comprising:
  receiving, by a text segmenter operated by a processor, a plurality of word segments, each word segment being of one or more words in length, including a first word segment and a second word segment;
  receiving, by display logic operated by the processor, a display rate adjustment;
  adjusting, by the display logic, a display rate in response to the display rate adjustment; and
  displaying, by the display logic, the first word segment and the second word segment separately without each other, with the second word segment automatically following the first word segment, the first word segment being displayed and visible during a first time period and the second word segment being displayed and visible during a second time period, the second time period following completion of the first time period, and lengths of the first and second time periods being based at least partially on the adjusted display rate.

2. The method of claim 1, wherein at least one of the lengths of the first and second time periods is further based on one or more of a length of the corresponding word segment, content of the corresponding word segment, or a punctuation of one of the corresponding words segment.

3. The method of claim 1, wherein at least one of the lengths of the first and second time periods is further based on a frequency of repetition of the corresponding word segment.

4. The method of claim 3, wherein at least one of the lengths of the first and second time periods is further based on a prior length.

5. The method of claim 1, wherein said receiving comprises receiving a sentence having the plurality of word segments, including the first and second word segments, with the second word segment following the first word segment, and the method further comprises generating the plurality of word segments from the sentence.

6. The method of claim 5, wherein the generating is based at least in part on one or more of a maximum word segment size, a display font, a horizontal spacing, or a text justification.

7. The method of claim 6, further comprising receiving an increment or a value for a selected one of the maximum word segment size, the display font, the horizontal spacing, or the text justification.

8. The method of claim 1, further comprising displaying an icon to indicate a presence of embedded graphical information among the plurality of word segments.

9. The method of claim 1, further comprising displaying a number indicating how many of the plurality of word segments have been displayed.

10. An apparatus comprising:
a processor;
a text segmenter to be operated by the processor to segment a sentence into a plurality of word segments including a first and a second of the word segments, with the second of the word segments following the first of the word segments, the segmenting being based at least in part on a maximum word segment size; and
logic to be operated by the processor to display the first of the word segments and a second of the word segments separately without each other, with the second of the word segments automatically following the first of the word segments, the first of the word segments being displayed and visible during a first time period and the second of the word segments being displayed and visible during a second time period, the second time period following completion of the first time period.

11. The apparatus of claim 10, wherein the segmenter is further configured to segment the sentence based on one or more of a display font, a horizontal spacing, or a text justification.

12. The apparatus of claim 11, wherein the text segmenter is further configured to receive an increment or a value for a selected one of the maximum word segment size, the display font, the horizontal spacing, or the text justification.

13. The apparatus of claim 11, wherein the logic is further configured to determine the lengths of the first and second time periods.

14. The apparatus of claim 13, wherein the logic is configured to determine each length based at least in part on a display rate.

15. The apparatus of claim 13, wherein the logic is configured to determine each length based at least in part on one or more of a length of the corresponding word segment, content of the corresponding word segments, a frequency of repetition of the word segment, or a punctuation of the corresponding word segments.

16. The apparatus of claim 10, wherein the logic is further configured to display an icon to indicate a presence of embedded graphical information among the plurality of word segments.

17. The apparatus of claim 10, wherein the logic is further configured to display a number indicating how many of the plurality of word segments have been displayed.

18. An article of manufacture comprising:
a storage medium; and
a plurality of programming instructions stored on the storage medium and configured to program a system to enable the system to perform a method, when the instructions are executed on the system, the method comprising:
receiving a plurality of word segments, each word segment being of one or more words in length,
first, displaying and making visible at least a portion of the word segments as a temporal sequence, each displayed word segment of the portion being separately displayed during a corresponding time period, without displaying the other word segments of the portion, wherein each corresponding time period follows completion of a previous corresponding time period;
receiving a signal requesting repetition of one or more words segments while performing the displaying; and
second, displaying a marked word segment associated with the signal requesting repetition.

19. The article of claim 18, wherein the method further comprises facilitating marking of a displayed word segment to enable the displayed word segment to be subsequently displayed as the marked word segment.

20. The article of claim 18, wherein to the method further comprises displaying word segments sequentially from the marked word segment.

21. The article of claim 18, wherein each of the word segments is displayed for a time period, the time period having been determined based on a display rate.

* * * * *